United States Patent
Reimann et al.

(10) Patent No.: US 11,863,971 B2
(45) Date of Patent: Jan. 2, 2024

(54) TRANSPORTATION VEHICLE, SYSTEM, APPARATUSES, METHODS, AND COMPUTER PROGRAMS FOR USER EQUIPMENT AND A NETWORK COMPONENT OF A MOBILE COMMUNICATION SYSTEM

(71) Applicant: VOLKSWAGEN AKTIENGESELLSCHAFT, Wolfsburg (DE)

(72) Inventors: Daniel Reimann, Braunschweig (DE); Guillaume Jornod, Berlin (DE)

(73) Assignee: VOLKSWAGEN AKTIENGESELLSCHAFT

( * ) Notice: Subject to any disclaimer, the term of this patent is extended or adjusted under 35 U.S.C. 154(b) by 0 days.

(21) Appl. No.: 16/795,628

(22) Filed: Feb. 20, 2020

(65) Prior Publication Data
US 2020/0275429 A1  Aug. 27, 2020

(30) Foreign Application Priority Data

Feb. 21, 2019 (EP) .................... 19158612

(51) Int. Cl.
*H04W 72/21* (2023.01)
*H04L 27/00* (2006.01)
*H04W 52/26* (2009.01)

(52) U.S. Cl.
CPC ......... *H04W 72/21* (2023.01); *H04L 27/0012* (2013.01); *H04W 52/262* (2013.01)

(58) Field of Classification Search
CPC ............ H04W 72/0413; H04W 52/262; H04L 27/0012; H04L 1/001; H04L 1/0006; H04L 1/0028
See application file for complete search history.

(56) References Cited

U.S. PATENT DOCUMENTS 9,503,930 B2   11/2016  Wang et al.
10,075,309 B2   9/2018  Chen et al.
(Continued)

FOREIGN PATENT DOCUMENTS

CN   103248450 A   8/2013
CN   106060948 A   10/2016
(Continued)

OTHER PUBLICATIONS

Lin et al.; 5G New Radio: Unveiling the Essentials of the Next Generation Wireless Access Technology; CoRR abs/1806.06898; Jun. 2018.
(Continued)

*Primary Examiner* — Kibrom T Hailu
*Assistant Examiner* — Robert Ma
(74) *Attorney, Agent, or Firm* — Barnes & Thornburg LLP

(57) ABSTRACT

A transportation vehicle, a system, apparatuses, methods, and a computer program for a user equipment and a network component of a mobile communication system. The method for a user equipment of a mobile communication system to receive control information includes receiving a first control information, wherein the first control information includes information related to a modulation format of second control information; and receiving a second control information using the modulation format indicated by the first control information.

20 Claims, 4 Drawing Sheets

(56) References Cited

U.S. PATENT DOCUMENTS

| | | | |
|---|---|---|---|
| 10,212,696 B2* | 2/2019 | Matsumoto | H04W 72/044 |
| 10,834,714 B2 | 11/2020 | Zhou et al. | |
| 2013/0083737 A1 | 4/2013 | Earnshaw et al. | |
| 2014/0198743 A1 | 7/2014 | Suzuki et al. | |
| 2016/0165593 A1 | 6/2016 | Wengerter et al. | |
| 2016/0174194 A1* | 6/2016 | Suzuki | H04W 72/0446 370/312 |
| 2016/0226621 A1* | 8/2016 | Ljung | H04L 41/0806 |
| 2019/0075525 A1 | 3/2019 | Urabayashi et al. | |
| 2019/0090292 A1* | 3/2019 | Tabet | H04W 76/14 |
| 2021/0266110 A1* | 8/2021 | Wang | H04L 1/1896 |

FOREIGN PATENT DOCUMENTS

| | | | | |
|---|---|---|---|---|
| CN | 106233649 A | 12/2016 | | |
| EP | 2804336 A1 * | 11/2014 | | H04L 1/0041 |
| EP | 2804336 A1 | 11/2014 | | |
| WO | 2017122045 A1 | 7/2017 | | |
| WO | WO-2017122045 A1 * | 7/2017 | | H04L 1/004 |
| WO | 2017195767 A1 | 11/2017 | | |

OTHER PUBLICATIONS

Search Report for European Patent Application No. 19158612.2; dated Aug. 9, 2019.
Office Action; Chinese Patent Application No. 202010107181.3; dated Sep. 2, 2022.
Office Action; Chinese Patent Application No. 202010107181.3; dated Mar. 9, 2023.

* cited by examiner

TRANSPORTATION VEHICLE, SYSTEM, APPARATUSES, METHODS, AND COMPUTER PROGRAMS FOR USER EQUIPMENT AND A NETWORK COMPONENT OF A MOBILE COMMUNICATION SYSTEM

PRIORITY CLAIM

This patent application claims priority to European Patent Application No. 19158612.2, filed 21 Feb. 2019, the disclosure of which is incorporated herein by reference in its entirety.

SUMMARY

Illustrative embodiments relate to a transportation vehicle, a system, apparatuses, methods, and a computer program for a user equipment and a network component of a mobile communication system, more particularly, but not exclusively, to a concept for control signaling in a mobile communication system.

BRIEF DESCRIPTION OF THE DRAWINGS

Disclosed embodiments will be described using the following non-limiting embodiments of apparatuses or methods or computer programs or computer program products by way of example only, and with reference to the accompanying figures, in which.

DETAILED DESCRIPTION

Figure 1:
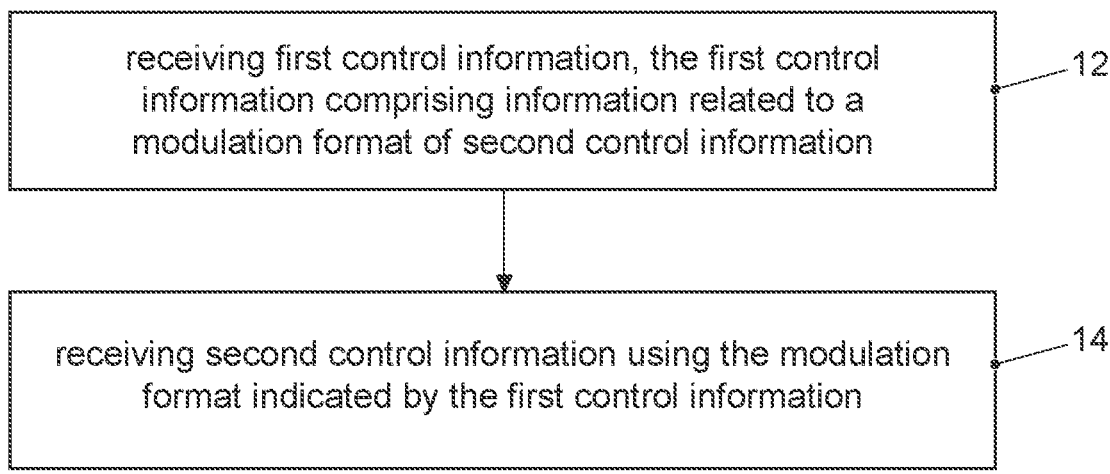
FIG. 1 illustrates a block diagram of an exemplary embodiment of a method for a user equipment.

Document US 2014/0198743 A1 describes a concept for signaling downlink control information, which signals transmission power control information. A mobile station device communicates with a base station device. The mobile station device receives, from the base station device, downlink control information, which contains first transmission power control information and second transmission power control information. The downlink control information is used for scheduling of a physical uplink shared channel. A value indicated by the first transmission power control information is accumulated and a transmission power of the physical uplink shared channel is calculated by employing both an accumulated resultant value and a value indicated by the second transmission power control information.

Document US 2016/0165593 A1 discloses a mechanism for reducing a control signaling overhead. To reduce a control channel overhead, a common field is defined for a transport format and redundancy version in the control channel information format.

According to one approach, the common field is used to jointly encode transport format and redundancy version therein. According to another disclosed embodiment, one shared field is provided on the control channel signal that indicates either a transport format or a redundancy version depending on whether the control channel signal relates to an initial transmission or a retransmission.

Xingqin Lin et al, "5G New Radio: Unveiling the Essentials of the Next Generation Wireless Access Technology", CoRR abs/1806.06898 (June 2018), give an overview of the 5th Generation New Radio 3GPP system. NR PDCCHs (New Radio Physical Downlink Control Channels) are specifically designed to transmit in a configurable control resource set (CORESET). A CORESET is analogous to the control region in LTE (Long Term Evolution) but is generalized in the sense that the set of RBs (Resource Blocks) and the set of OFDM (Orthogonal Frequency Division Multiplexing) symbols in which it is located are configurable with the corresponding PDCCH (Physical Downlink Control Channel) search spaces. Such configuration flexibilities of control regions including time, frequency, numerologies, and operating points enable NR to address a wide range of use cases.

Conventional concepts consider flexible resource utilization for control channel signaling. Using implicit signaling and pre-configuration the concepts enable efficient control signaling. At the same time configuration and flexibility of payload transmission formats are increasing, such that the number of different configurations is also increasing.

There is a demand for an improved concept for control signaling in a mobile communication system.

Disclosed embodiments are based on the finding that the number of transport formats for payload transmission in mobile communication system is growing. For example, in addition to modulation and coding schemes numerologies may be adapted, for example, the bandwidth of a subcarrier. In addition, a flexible assignment of transmission slots and transmission direction may be carried out, e.g., dynamic Time Division Duplex (TDD). Although not all these parameters may be changed on a Transmission Time Interval (TTI) basis today, it is foreseen that the transmission formats will become more and more flexible and adaptive. Therefore, the corresponding control signaling needs to signal more and more details, each variable parameter has to be determined at the receiver side, which is done by signaling or by leaving search spaces, which have to be searched by the receiver. It is a finding, that with the enhancements of signal processing, the higher order modulation schemes used, control information can be signaled more efficiently by using these modulation schemes. However, since the modulation scheme may change depending of the radio quality, a signaling would be necessary to indicate the modulation format of the further control information.

Disclosed embodiments provide a method for a user equipment of a mobile communication system to receive control information. The method comprises receiving a first control information. This first control information comprises information related to a modulation format of a second control information. The method further comprises receiving the second control information using the modulation format indicated by the first control information. Control information can be communicated more efficiently by using advanced modulation.

In further disclosed embodiments the first control information may comprise information related to one or more elements of the group of a coding scheme, a radio resource, a precoding vector, frequency hopping, and a transmission rank. Advanced transmission concepts may be made available for control information in disclosed embodiments.

The method may further comprise receiving information related to predefined radio resources and a predefined modulation format for receiving the first control information. Radio transmission parameters for the first control information may be predefined, such that information on the actual transport format of the second control information may be received.

The second control information may then comprise information related to a transmission format of payload data. The transmission format of the actual payload data may hence be transmitted in a two-stage mechanism via the first and second control information, which may enable a more efficient communication of complex transport formats of payload data.

Disclosed embodiments also provide a method for a network component of a mobile communication system to signal control information to a user equipment. The method comprises transmitting a first control information. The first control information comprises information related to a modulation format of second control information. The method further comprises transmitting a second control information using the modulation format indicated by the first control information. Disclosed embodiments may enable an efficient two-stage signaling scheme for signaling control information from a network component to the user equipment.

The second control information may comprise information related to uplink or downlink transmission. Disclosed embodiments may enable efficient control information signaling for both directions of transmission.

For example, in some disclosed embodiments the method may further comprise configuring a set of transport formats with different modulations for the second control information. The first control information may comprise a reference to one of the transport formats of the set. Disclosed embodiments may further reduce a signaling overhead by using references to pre-configurations.

In some disclosed embodiments, the method may comprise adapting the modulation format of the second control information based on radio conditions of the user equipment. The format of the second control information may hence be adapted to the radio conditions of the user equipment. In case of beneficial radio conditions, a higher order modulation scheme may be used as compared to a case of detrimental radio conditions.

Disclosed embodiments further provide an apparatus for a user equipment of a mobile communication system. The apparatus comprises one or more interfaces configured to communicate in the mobile communication system. The apparatus further comprises a control module, which is configured to control the one or more interfaces. The control module is further configured to perform one of the methods described herein. Another disclosed embodiment is an apparatus for a network component of a mobile communication system. The apparatus for the network component comprises one or more interfaces configured to communicate in the mobile communication system. The apparatus for the network component comprises a control module, which is configured to control the one or more interfaces. The control module is further configured to perform one of the methods described herein.

Other disclosed embodiments are a transportation vehicle or a network component comprising one of the apparatuses described herein, a system with both, respectively.

Disclosed embodiments further provide a computer program having a program code for performing one or more of the above described methods, when the computer program is executed on a computer, processor, or programmable hardware component. A further disclosed embodiment is a computer readable storage medium storing instructions which, when executed by a computer, processor, or programmable hardware component, cause the computer to implement one of the methods described herein.

Various example embodiments will now be described more fully with reference to the accompanying drawings in which some example embodiments are illustrated. In the figures, the thicknesses of lines, layers or regions may be exaggerated for clarity. Optional components may be illustrated using broken, dashed or dotted lines.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like or similar elements throughout the description of the figures.

As used herein, the term "or" refers to a non-exclusive or, unless otherwise indicated (e.g., "or else" or "or in the alternative"). Furthermore, as used herein, words used to describe a relationship between elements should be broadly construed to include a direct relationship or the presence of intervening elements unless otherwise indicated. For example, when an element is referred to as being "connected" or "coupled" to another element, the element may be directly connected or coupled to the other element or intervening elements may be present. In contrast, when an element is referred to as being "directly connected" or "directly coupled" to another element, there are no intervening elements present. Similarly, words such as "between", "adjacent", and the like should be interpreted similarly.

The terminology used herein is for the purpose of describing disclosed embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "includes" or "including", when used herein, specify the presence of stated features, integers operations, elements or components, but do not preclude the presence or addition of one or more other features, integers operations, elements, components or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

FIG. 1 shows a block diagram of an exemplary embodiment of a method 10 for a user equipment of a mobile communication system, which receives control information. The method 10 comprises receiving 12 first control information. The first control information comprises information related to a modulation format of second control information. The method 10 further comprises receiving 14 second control information using the modulation format indicated by the first control information.

Figure 2:
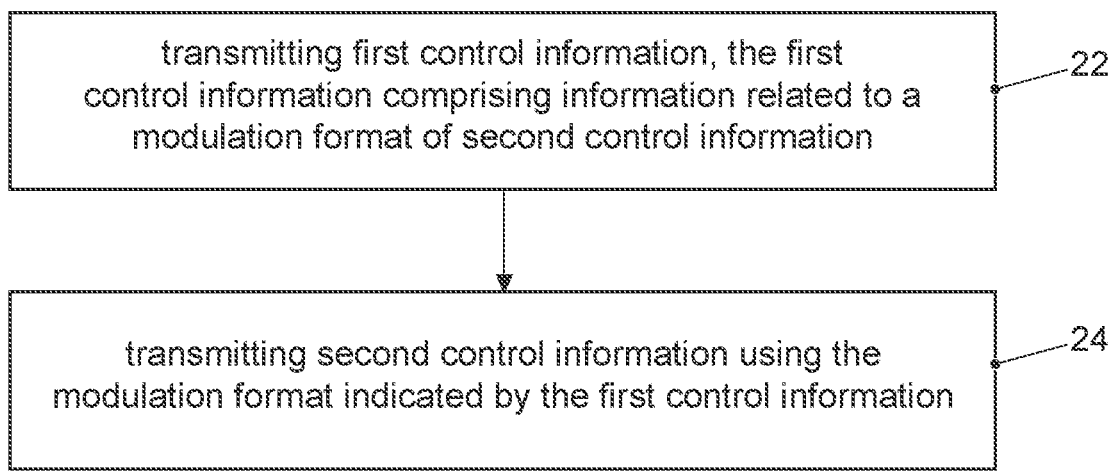
FIG. 2 shows a block diagram of an exemplary embodiment of a method for a network component.

FIG. 2 shows a block diagram of an exemplary embodiment of a method 20 for a network component of a mobile communication system to signal control information to a user equipment. The method 20 comprises transmitting 22 first control information. The first control information comprises information related to a modulation format of second control information. The method 20 further comprises transmitting 24 second control information using the modulation format indicated by the first control information.

Figure 3:
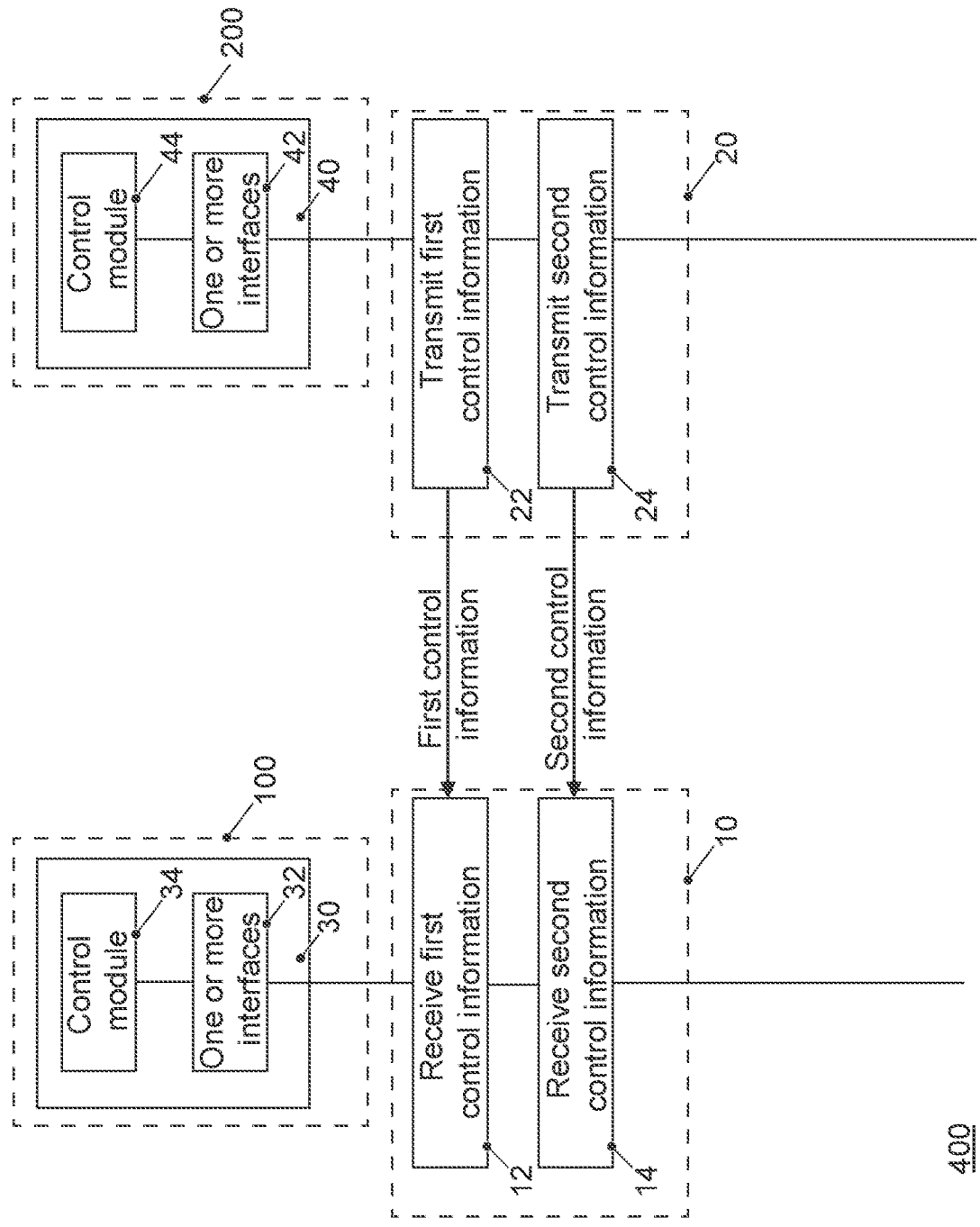
FIG. 3 illustrates a block diagram of an exemplary embodiments of an apparatus for a user equipment, an apparatus for a network component, a user equipment, a network component, and a system.

FIG. 3 illustrates a block diagram of disclosed embodiments of an apparatus 30 for a user equipment 100, an apparatus 40 for a network component 200, a user equipment 100, a network component 200, and a system 400.

The apparatus 30 for the user equipment 100 (UE) comprises one or more interfaces 32 configured to communicate in the mobile communication system 400. The apparatus 30 further comprises a control module 34, which is coupled to the one or more interfaces 32 and which is configured to control the one or more interfaces 32. The control module 34 is further configured to perform one of the methods 10 as described herein. FIG. 3 further illustrates an exemplary embodiment of the user equipment 100 comprising an exemplary embodiment of the apparatus 30. FIG. 3 also shows an exemplary embodiment of an apparatus 40 for a network component 200 of a mobile communication system 400. The apparatus 40 comprises one or more interfaces 42, which are configured to communicate in the mobile communication system 400. The apparatus 40 further comprises a control module 44, which is coupled to the one or more interfaces 42 and which is configured to control the one or more interfaces 42. The control module 44 is further configured to perform one of the methods 20 described herein.

In disclosed embodiments the one or more interfaces 32, 42 may correspond to any method or mechanism for obtaining, receiving, transmitting or providing analog or digital signals or information, e.g., any connector, contact, pin, register, input port, output port, conductor, lane, etc. which allows providing or obtaining a signal or information. An interface may be wireless or wireline and it may be configured to communicate, i.e., transmit or receive signals, information with further internal or external components. The one or more interfaces 32, 42 may comprise further components to enable according communication in the mobile communication system 400, such components may include transceiver (transmitter and/or receiver) components, such as one or more Low-Noise Amplifiers (LNAs), one or more Power-Amplifiers (PAs), one or more duplexers, one or more diplexers, one or more filters or filter circuitry, one or more converters, one or more mixers, accordingly adapted radio frequency components, etc. The one or more interfaces 32, 42 may be coupled to one or more antennas, which may correspond to any transmit and/or receive antennas, such as horn antennas, dipole antennas, patch antennas, sector antennas etc. The antennas may be arranged in a defined geometrical setting, such as a uniform array, a linear array, a circular array, a triangular array, a uniform field antenna, a field array, combinations thereof, etc. In some examples the one or more interfaces 32, 42 may serve the purpose of transmitting or receiving or both, transmitting and receiving, information, such as information related to capabilities, control information, payload information, application requirements, trigger indications, requests, messages, data packets, acknowledgement packets/messages, etc.

As shown in FIG. 3 the one or more interfaces 32, 42 are coupled to the control module 34, 44 at the apparatus 30,40. In disclosed embodiments the control module 34, 44 may be implemented using one or more processing units, one or more processing devices, any method or mechanism for processing, such as a processor, a computer or a programmable hardware component being operable with accordingly adapted software. In other words, the described functions of the control modules 34, 44 may as well be implemented in software, which is then executed on one or more programmable hardware components. Such hardware components may comprise a general purpose processor, a Digital Signal Processor (DSP), a micro-controller, etc.

FIG. 3 also shows an exemplary embodiment of a system 400 comprising disclosed embodiments of the transportation vehicles 100, 200. In disclosed embodiments, communication, i.e., transmission, reception or both, may take place among transportation vehicles 100, 200 directly and/or between mobile transceivers/transportation vehicles 100, 200 and a network component (infrastructure or mobile transceiver, e.g., a base station, a network server, a backend server, etc.). Such communication may make use of a mobile communication system 400. Such communication may be carried out directly, e.g., by device-to-device (D2D) communication, which may also comprise vehicle-to-vehicle (V2V) or car-to-car communication in case of transportation vehicles 100, 200. Such communication may be carried out using the specifications of a mobile communication system 400.

In disclosed embodiments the one or more interfaces 32, 42 can be configured to wirelessly communicate in the mobile communication system 400. To do so radio resources are used, e.g., frequency, time, code, and/or spatial resources, which may be used for wireless communication with a base station transceiver as well as for direct communication. The assignment of the radio resources may be controlled by a base station transceiver, i.e., the determination which resources are used for D2D and which are not. Here and in the following radio resources of the respective components may correspond to any radio resources conceivable on radio carriers and they may use the same or different granularities on the respective carriers. The radio resources may correspond to a Resource Block (RB as in LTE/LTE-A/LTE-unlicensed (LTE-U)), one or more carriers, subcarriers, one or more radio frames, radio sub-frames, radio slots, one or more code sequences potentially with a respective spreading factor, one or more spatial resources, such as spatial sub-channels, spatial precoding vectors, any combination thereof, etc.

For example, in direct cellular vehicle-to-anything (C-V2X), where V2X includes at least V2V, V2-Infrastructure (V2I), etc., transmission according to 3GPP Release 14 onward can be managed by infrastructure (so-called mode 3) or run in a UE.

FIG. 3 also illustrates the methods 10 from the perspective of the user equipment 100 and the method 20 from the perspective of the network component 200. The network component 200 transmits 22 first control information, which is received 12 at the UE 100. The first control information comprises information related to a modulation format of second control information. The network component 200 then transmits 24 second control information using the modulation format indicated by the first control information, which is received 14 at the UE 100.

The mobile communication system 400, as shown in FIG. 3, may, for example, correspond to one of the Third Generation Partnership Project (3GPP)-standardized mobile communication networks, where the term mobile communication system is used synonymously to mobile communication network. The mobile or wireless communication system 400 may correspond to a mobile communication system of the 5th Generation (5G, or New Radio (NR)) and may use mm-Wave technology. The mobile communication system may correspond to or comprise, for example, a Long-Term Evolution (LTE), an LTE-Advanced (LTE-A), High Speed Packet Access (HSPA), a Universal Mobile Telecommunication System (UMTS) or a UMTS Terrestrial Radio Access Network (UTRAN), an evolved-UTRAN (e-UTRAN), a Global System for Mobile communication (GSM) or Enhanced Data rates for GSM Evolution (EDGE) network, a GSM/EDGE Radio Access Network (GERAN), or mobile communication networks with different standards, for example, a Worldwide Inter-operability for Microwave Access (WIMAX) network IEEE 802.16 or Wireless Local Area Network (WLAN) IEEE 802.11, generally an Orthogonal Frequency Division Multiple Access (OFDMA) network, a Time Division Multiple Access (TDMA) network, a Code Division Multiple Access (CDMA) network, a Wideband-CDMA (WCDMA) network, a Frequency Division Multiple Access (FDMA) network, a Spatial Division Multiple Access (SDMA) network, etc.

Service provision may be carried out by a network component 200, such as a base station transceiver, a relay station or a UE, e.g., coordinating service provision in a cluster or group of multiple UEs. A base station transceiver can be operable or configured to communicate with one or more active mobile transceivers/transportation vehicles 100 and a base station transceiver can be located in or adjacent to a coverage area of another base station transceiver, e.g., a macro cell base station transceiver or small cell base station transceiver. Hence, disclosed embodiments may provide a mobile communication system 400 comprising two or more mobile transceivers/transportation vehicles 100 and one or more base station transceivers, wherein the base station transceivers may establish macro cells or small cells, as, e.g., pico-, metro-, or femto cells. A mobile transceiver or UE may correspond to a smartphone, a cell phone, a laptop, a notebook, a personal computer, a Personal Digital Assistant (PDA), a Universal Serial Bus (USB)-stick, a car, a transportation vehicle etc. A mobile transceiver may also be referred to as User Equipment (UE) or the user equipment or mobile in line with the 3GPP terminology. A transportation vehicle may correspond to any conceivable method or mechanism for transportation, e.g., a car, a bike, a motorbike, a van, a truck, a bus, a ship, a boat, a plane, a train, a tram, etc.

A base station transceiver can be located in the fixed or stationary part of the network or system. A base station transceiver may be or correspond to a remote radio head, a transmission point, an access point, a macro cell, a small cell, a micro cell, a femto cell, a metro cell etc. A base station transceiver can be a wireless interface of a wired network, which enables transmission of radio signals to a UE or mobile transceiver. Such a radio signal may comply with radio signals as, for example, standardized by 3GPP or, generally, in line with one or more of the above listed systems. Thus, a base station transceiver may correspond to a NodeB, an eNodeB, a Base Transceiver Station (BTS), an access point, a remote radio head, a relay station, a transmission point etc., which may be further subdivided in a remote unit and a central unit.

A mobile transceiver/transportation vehicle 100 can be associated with a base station transceiver or cell. The term cell refers to a coverage area of radio services provided by a base station transceiver, e.g., a NodeB (NB), an eNodeB (eNB), a remote radio head, a transmission point, etc. A base station transceiver may operate one or more cells on one or more frequency layers, in some disclosed embodiments a cell may correspond to a sector. For example, sectors can be achieved using sector antennas, which provide a characteristic for covering an angular section around a remote unit or base station transceiver. In some disclosed embodiments, a base station transceiver may, for example, operate three or six cells covering sectors of 120° (in case of three cells), 60° (in case of six cells) respectively. A base station transceiver may operate multiple sectorized antennas. In the following a cell may represent an according base station transceiver generating the cell or, likewise, a base station transceiver may represent a cell the base station transceiver generates.

UEs/Transportation Vehicles 100 may communicate directly with each other, i.e., without involving any base station transceiver, which is also referred to as Device-to-Device (D2D) communication. An example of D2D is direct communication between transportation vehicles, also referred to as Vehicle-to-Vehicle communication (V2V), car-to-car, DSRC, respectively. Technologies enabling such D2D-communication include 802.11p, 3GPP system (4G, 5G, NR and beyond), etc.

Physical channel parameters become more and more configurable. For example, recent developments of physical layer specifications consider different time interval and bandwidth configurations, e.g., also referred to as numerologies in 3GPP. Newer releases allow configuring the subcarrier bandwidth in an OFDM access scheme, examples are 15 kHz, 30 kHz, 60 kHz, 120 kHz, 240 kHz, etc., which relate to different symbol durations, 66.7 µs, 33.3 µs, 16.6 µs, 8.33 µs, 4.17 µs, etc. Moreover, duplex schemes become adaptable, also referred to as dynamic TDD. Time slots of a radio frame can be dynamically assigned to different transmission directions, e.g., uplink/downlink, transmission/reception, etc. These options may be further combined with different modulation schemes, $\pi/2$-BPSK (Binary Phase Shift Keying), BPSK, Quaternary PSK, 16QAM (Quadrature Amplitude Modulation), 64QAM, 256QAM, etc. Further options are provided with respect to coding schemes, e.g., code rates. Other parameters are spatial processing, e.g., using a plurality of spatial subchannels for which pre-coding information and a transmission rank (number of multiplexed spatial channels) needs to be communicated.

These are only some example parameters, which are used to configure a physical channel, and which may make up a transport format. To enable successful transmission, communication partners need to be informed of the physical channel configuration. Since more and more of these parameters become adaptive to the channel and network conditions, the amount of control information, which needs to be exchanged between communication partners, is increasing. Disclosed embodiments are based on the finding that the advance configurations may as well be used for control information.

The first control information may hence be a smaller amount of information, e.g., in terms of a lower number of bits. It may be used in a first physical control channel, which is preconfigured, e.g., by a robust parameter setting such as most robust modulation and coding scheme, the most robust physical channel parametrization/configuration. The first control information may then be used to point at or reference the second control information, which may use a more advanced configuration/parametrization, e.g., with a higher spectral efficiency than that of the first control information. Since at least a part of the control information can be transmitted with a higher spectral efficiency the overall efficiency may be increased.

Whether a higher modulation scheme can be supported by a certain UE may depend on the respective radio channel conditions, e.g., the pathloss and interference situation in the network. Therefore, at least in some disclosed embodiments channel estimation mechanisms may be used to determine the radio channel condition. Such mechanisms may use reference symbol or channel transmission enabling channel measurements. Feedback channels may be in place to inform a communication partner on the radio channel condition. In some disclosed embodiments channel reciprocity may be used to estimate a radio channel in one direction based on measurements conducted in the opposite direction (e.g., in TDD).

Figure 4:
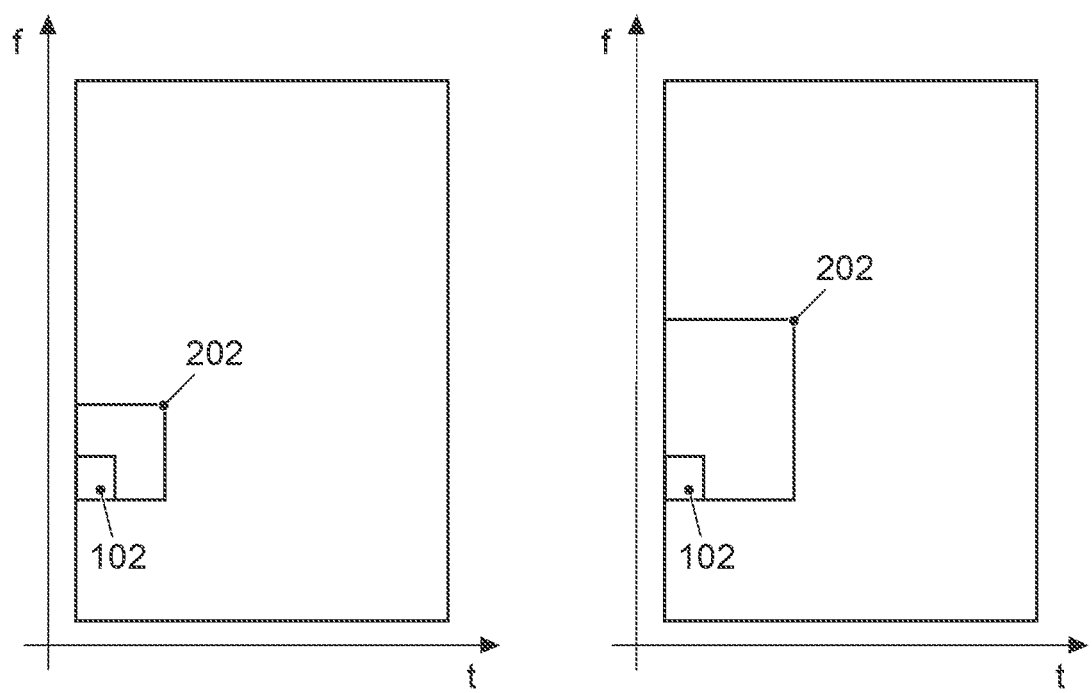
FIG. 4 depicts resource assignment in an exemplary embodiment.

FIG. 4 depicts resource assignments in an exemplary embodiment. FIG. 4 depicts two resource planes in an exemplary embodiment. For example, these resource planes may correspond to time-frequency (t, f) resource grids in a 5G or NR system. FIG. 4 further illustrates first control information 102 and second control information 202. In this disclosed embodiment it is assumed that the first control information 102 is in a pre-defined format and transmitted using predefined radio resources. For example, the parameters for the first control information 102 may be provided by broadcast system information or specifications of the mobile communication system. The UE may receive information related to predefined radio resources and a pre-defined modulation format for receiving the first control information from the network component.

In the disclosed embodiments shown in FIG. 4 it is further assumed that the radio channel is estimated on the network component's side—be it for transmission or reception. The network component providing the first and second control information may hence adapt the modulation format and potentially other parameters of the second control information based on radio conditions of the user equipment. The first control information 102 comprises information related to one or more elements of the group of a coding scheme, a radio resource, a precoding vector, frequency hopping, and a transmission rank, for the second control information 202. A coding scheme may define a code, a code rate, a redundancy version, etc. A precoding vector may define a spatial precoding or beamforming setting used for transmission, where multiple precoding vectors can be used for spatial multiplexing as in Multiple-Input-Multiple-Output (MIMO) transmission. A transmission may indicate how many spatial subchannels are multiplexed. Frequency hopping information may be used to indicated whether frequency hopping is used or not and if it is used, it may further indicate a certain frequency hopping sequence, bandwidth, hopping width, etc.

A combination of these and other physical channel parameters may be considered a transport format. In disclosed embodiments such a transport format may be defined by the first control information for the second control information and by the second control information for payload transmission.

After having received the first control information 102 the UE knows, where to look for and how to receive the second control information 202. It is noted that the first control information 102 might not be unambiguous and may require the UE 100 to still consider multiple options for the second control information 202. One concept is that of a limited search space, which the UE has to search to find and identify the second control information 202. For example, the UE tries different parameter settings and finds successfully decoded second control information through a cyclic redundancy check (CRC). The first or second control information 102, 202 might comprise certain identification, so the UE can identify that the control information does not address another UE. The first control information 102 may hence define a limited search space for a UE to search for the second control information 202.

The second control information 202 may comprise information related to a transmission format of payload data. The second control information may comprise information related to uplink or downlink transmission. As further shown in FIG. 4 on the right, the second control information 202 may occupy different amounts of radio resources. For example, in the scenario on the right the UE 100 may experience better channel conditions than in the scenario depicted on the left. Accordingly, a higher modulation scheme (e.g., 64 QAM) can be supported for the second control information 202 in the scenario on the left that on the right side (e.g., BPSK). To signal the same amount of information (number of bits), more radio resources are needed to signal the second control information 202 in the scenario on the right, which is indicated by a larger rectangle.

In further disclosed embodiments a set of transport formats with different modulations for the second control information 202 can be configured. The first control information 102 may then comprise a reference to one of the transport formats of the set and just point to a preconfigured transport format.

Figure 5:
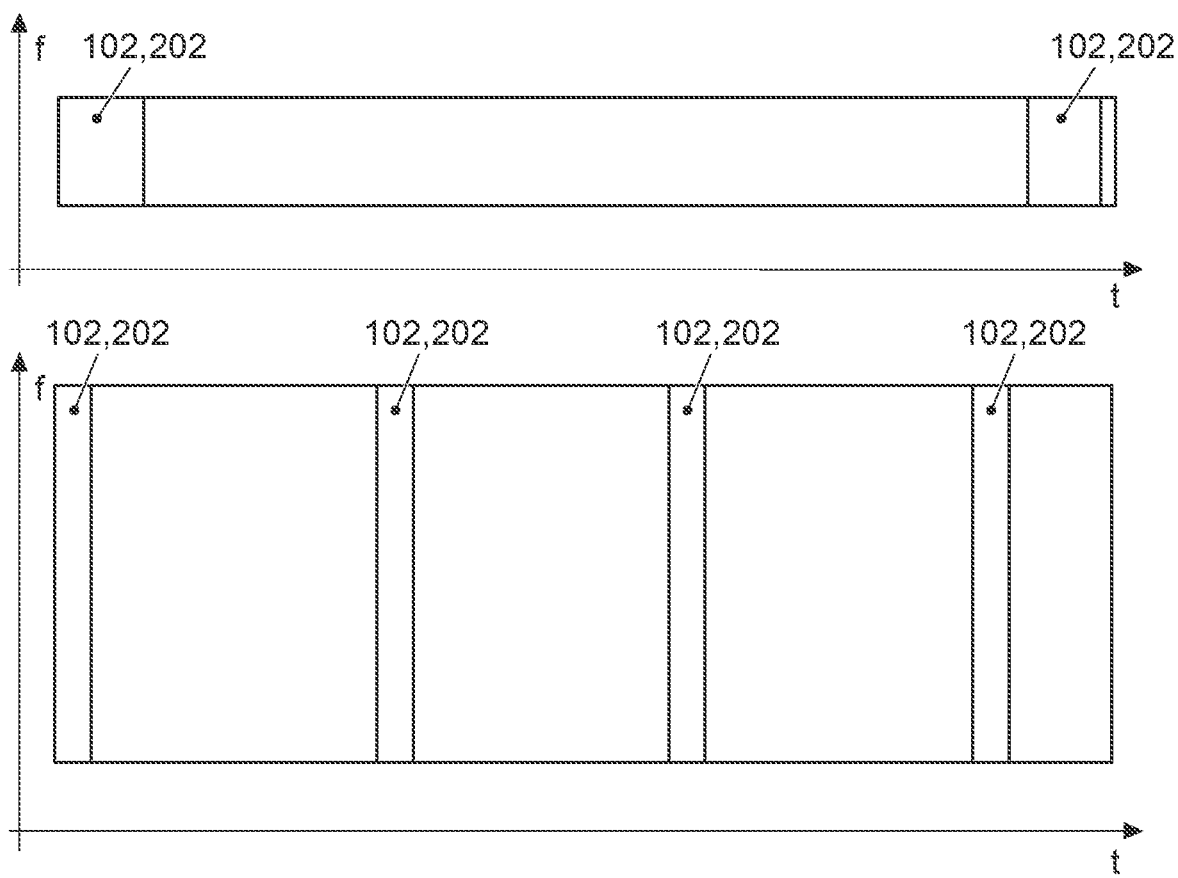
FIG. 5 shows resource assignment in another exemplary embodiment.

FIG. 5 shows resource assignment in another disclosed embodiment. FIG. 5 shows two time-frequency charts for which different subcarrier bandwidths are assumed, a narrow bandwidth at the top and a wider bandwidth at the bottom. As can be seen for the narrow configuration at the top the control information 102, 202 occupies a different time share compared to the wider configuration at the bottom. In the scenario at the bottom the control information is repeated more often due to the shorter duration of the radio frame.

As already mentioned, in disclosed embodiments the respective methods may be implemented as one computer program or computer programs or codes, which can be executed on a respective hardware. Hence, another disclosed embodiment is a computer program having a program code for performing at least one of the above methods, when the computer program is executed on a computer, a processor, or a programmable hardware component. A further disclosed embodiment is a (non-transitory) computer readable storage medium storing instructions which, when executed by a computer, processor, or programmable hardware component, cause the computer to implement one of the methods described herein.

A person of skill in the art would readily recognize that operations of various above-described methods can be performed by programmed computers, for example, positions of slots may be determined or calculated. Herein, some disclosed embodiments are also intended to cover program storage devices, e.g., digital data storage media, which are machine or computer readable and encode machine-executable or computer-executable programs of instructions where the instructions perform some or all of the operations of methods described herein. The program storage devices may be, e.g., digital memories, magnetic storage media such as magnetic disks and magnetic tapes, hard drives, or optically readable digital data storage media. The disclosed embodiments are also intended to cover computers programmed to perform the operations of methods described herein or (field) programmable logic arrays ((F)PLAs) or (field) programmable gate arrays ((F)PGAs), programmed to perform the operations of the above-described methods.

The description and drawings merely illustrate the principles of the disclosure. It will thus be appreciated that those skilled in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed to furthering the art, and are to be construed as being without limitation to such specifically recited examples and conditions. Moreover, all statements herein reciting principles and embodiments of the disclosure, as well as specific examples thereof, are intended to encompass equivalents thereof.

When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, Digital Signal Processor (DSP) hardware, network processor, application specific integrated circuit (ASIC), field programmable gate array (FPGA), read only memory (ROM) for storing software, random access memory (RAM), and non-volatile storage. Other hardware, conventional or custom, may also be included. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the detailed description, where each claim may stand on its own as a separate disclosed embodiment. While each claim may stand on its own as a separate disclosed embodiment, it is to be noted that—although a dependent claim may refer in the claims to a specific combination with one or more other claims—other disclosed embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having a method or mechanism for performing each of the respective operations of these methods.

LIST OF REFERENCE SIGNS 10 method for a user equipment
12 receiving first control information, the first control information comprising information related to a modulation format of second control information
14 receiving second control information using the modulation format indicated by the first control information
20 method for network component
22 transmitting first control information, the first control information comprising information related to a modulation format of second control information
24 transmitting second control information using the modulation format indicated by the first control information
30 apparatus for a user equipment
32 one or more interfaces
34 control module
40 apparatus for network component
42 one or more interfaces
44 control module
100 user equipment
102 first control information
200 network component
202 second control information
400 mobile communication system

The invention claimed is:

1. An apparatus for user equipment disposed within a transportation vehicle, the apparatus comprising:
one or more communication interfaces configured to establish and maintain communication with a mobile communication system; and
a control module configured to control the one or more communication interfaces, wherein the control module is configured to:
receive, via the one or more communication interfaces, first control information using a first modulation format, wherein the first control information indicates a second modulation format to be used by the apparatus to receive second control information, wherein the first modulation format is different than the second modulation format, wherein the first control information comprises a reference to one of a set of configured transport formats with different modulations for the second control information, and
receive, via the one or more communication interfaces, the second control information using the second modulation format indicated by the first control information, wherein the control module receives the second control information subsequent to receiving the first control information,
wherein the second control information comprises payload data transmission format information including physical channel parameters,
wherein payload data transmission format delivery is performed in a two-stage mechanism via communication of the first and second control information,
wherein the first or second control information comprise an identification enabling the first user equipment to identify that the first or second control information do not address another user equipment, and
wherein parameters used to configure channel delivery of the payload data are adaptive to change based on radio quality conditions of the user equipment and are included in the second control information such that a higher order modulation scheme is used based on advantageous radio quality conditions relative to a lower order modulation scheme being used based on disadvantageous radio conditions.

2. An apparatus for a network component of a mobile communication system, the apparatus comprising:

one or more network communication interfaces configured to communicate in the mobile communication system; and a control module configured to control the one or more network communication interfaces to establish communication with user equipment, wherein the control module is configured to:

transmit, to a control module via one or more communication interfaces of the user equipment, first control information, wherein the first control information has a first modulation format, wherein the first control information indicates a second modulation format to be used to receive second control information, wherein the first modulation format is different than the second modulation format, wherein the first control information comprises a reference to one of a set of configured transport formats with different modulations for the second control information; and transmit the second control information using the modulation format indicated by the first control information, wherein the second control information is transmitted subsequent to transmitting the first control information, wherein the second control information comprises payload data transmission format information including physical channel parameters, wherein payload data transmission format delivery is performed in a two-stage mechanism via communication of the first and second control information, wherein the first or second control information comprise an identification enabling the user equipment to identify that the first or second control information do not address another user equipment, and wherein parameters used to configure channel delivery of the payload data are adaptive to change based on radio quality conditions of the user equipment and are included in the second control information such that a higher order modulation scheme is used based on advantageous radio quality conditions relative to a lower order modulation scheme being used based on disadvantageous radio conditions.

3. A non-transitory computer readable medium including a computer program having a program code for performing a method for user equipment communicating in a mobile communication system to receive control information, when the computer program is executed on a computer, a processor, or a programmable hardware component, the method comprising:

receiving, by a control module via one or more communication interfaces included in the user equipment, first control information using a first modulation format, wherein the first control information indicates a second modulation format to be used to receive second control information, wherein the first modulation format is different than the second modulation format, and receiving, via the one or more communication interfaces, the second control information using the second modulation format indicated by the first control information, wherein the control module receives the second control information subsequent to receiving the first control information, wherein the first control information comprises a reference to one of a set of configured transport formats with different modulations for the second control information, wherein the second control information comprises information payload data transmission format information including physical channel parameters, wherein payload data transmission format delivery is performed in a two-stage mechanism via communication of the first and second control information, wherein the first or second control information comprise an identification enabling the first user equipment to identify that the first or second control information do not address another user equipment, and wherein parameters used to configure channel delivery of the payload data are adaptive to change based on radio quality conditions of the user equipment and are included in the second control information such that a higher order modulation scheme is used based on advantageous radio quality conditions relative to a lower order modulation scheme being used based on disadvantageous radio conditions.

4. A non-transitory computer readable medium including a computer program having a program code for performing a method for a network component of a mobile communication system to signal control information to user equipment in a transportation vehicle, when the computer program is executed on a computer, a processor, or a programmable hardware component, the method comprising:

transmitting, to the user equipment via a control module via one or more communication of the user equipment, first control information, wherein the first control information has a first modulation format and indicates a second modulation format to be used by the apparatus to receive second control information, wherein the first modulation format is different than the second modulation format, wherein the first control information comprises a reference to one of a set of configured transport formats with different modulations for the second control information; and transmitting the second control information using the modulation format indicated by the first control information, wherein the second control information is transmitted subsequent to transmitting the first control information, wherein the second control information comprises payload data transmission format information including physical channel parameters, wherein payload data transmission format delivery is performed in a two-stage mechanism via communication of the first and second control information, wherein the first or second control information comprise an identification enabling the first user equipment to identify that the first or second control information do not address another user equipment, and wherein parameters used to configure channel delivery of the payload data are adaptive to change based on radio quality conditions of the user equipment and are included in the second control information such that a higher order modulation scheme is used based on advantageous radio quality conditions relative to a lower order modulation scheme being used based on disadvantageous radio conditions.

5. A method for a user equipment disposed within a transportation vehicle to receive control information, the method comprising:

receiving, by a control module via one or more communication interfaces, first control information using a first modulation format, wherein the first control information indicates a second modulation format to be used to receive second control information, wherein the first modulation format is different than the second modulation format, and receiving, via the one or more communication interfaces, the second control information using the second modulation format indicated by the first control information, wherein the control module receives the second control information subsequent to receiving the first control information, wherein the first control information comprises a reference to one of a set of configured transport formats with different modulations for the second control information, wherein the second control information comprises information payload data transmission format information including physical channel parameters, wherein payload data transmission format delivery is performed in a two-stage mechanism via communication of the first and second control information, wherein the first or second control information comprise an identification enabling the user equipment to identify that the first or second control information do not address another user equipment, and wherein parameters used to configure channel delivery of the payload data are adaptive to change based on radio quality conditions of the user equipment and are included in the second control information such that a higher order modulation scheme is used based on advantageous radio quality conditions relative to a lower order modulation scheme being used based on disadvantageous radio conditions.

6. The method of claim 5, wherein the first control information indicates at least one of a coding scheme, a radio resource, a precoding vector, frequency hopping, and a transmission rank used in the second control information.

7. The method of claim 5, wherein the first control information points to or references predefined radio resources and a predefined modulation format for receiving the second control information.

8. A method for a network component of a mobile communication system to signal control information to user equipment, the method comprising:

transmitting, to a control module via one or more communication interfaces of the user equipment first control information, wherein the first control information has a first modulation format and indicates a second modulation format to be used to receive second control information, wherein the first modulation format is different than the second modulation format; and transmitting the second control information using the modulation format indicated by the first control information, wherein the control module and the one or more communication interfaces are disposed within the user equipment disposed within a transportation vehicle, wherein the second control information is transmitted subsequent to transmitting the first control information, wherein the first control information comprises a reference to one of a set of configured transport formats with different modulations for the second control information, wherein the second control information comprises payload data transmission format information including physical channel parameters, wherein payload data transmission format delivery is performed in a two-stage mechanism via communication of the first and second control information, wherein the first or second control information comprise an identification enabling the first user equipment to identify that the first or second control information do not address another user equipment, and wherein parameters used to configure channel delivery of the payload data are adaptive to change based on radio quality conditions of first user equipment and are included in the second control information such that a higher order modulation scheme is used based on advantageous radio quality conditions relative to a lower order modulation scheme being used based on disadvantageous radio conditions.

9. The method of claim 8, wherein the first control information indicates at least one of a coding scheme, a radio resource, a precoding vector, frequency hopping, and a transmission rank used in the second control information.

10. The method of claim 8, wherein the second control information comprises information related to uplink or downlink transmission.

11. The method of claim 8, further comprising using predefined radio resources and a predefined modulation format for transmitting the second control information.

12. The method of claim 8, further comprising adapting the modulation format of the second control information based on radio conditions of the user equipment.

13. The apparatus of claim 1, wherein the first control information indicates one of a plurality of transport formats, wherein each transport format corresponds to a different one of a plurality of modulations configured for the second control information.

14. The apparatus of claim 1, wherein the second modulation format of the second control information is based on radio conditions of the first user equipment.

15. The apparatus of claim 2, wherein the first control information indicates one of a plurality of transport formats, wherein each transport format corresponds to a different one of a plurality of modulations configured for the second control information.

16. The apparatus of claim 2, wherein the second modulation format of the second control information is based on radio conditions of the first user equipment.

17. The method of claim 3, wherein the first control information indicates one of a plurality of transport formats, wherein each transport format corresponds to a different one of a plurality of modulations configured for the second control information.

18. The method of claim 3, wherein the second modulation format of the second control information is based on radio conditions of the first user equipment.

19. The method of claim 4, wherein the first control information indicates one of a plurality of transport formats, wherein each transport format corresponds to a different one of a plurality of modulations configured for the second control information.

20. The method of claim 4, wherein the second modulation format of the second control information is based on radio conditions of the first user equipment.

* * * * *